(12) United States Patent
Niwata et al.

(10) Patent No.: US 12,107,273 B2
(45) Date of Patent: Oct. 1, 2024

(54) NONAQUEOUS ELECTROLYTE SECONDARY BATTERY

(71) Applicant: MURATA MANUFACTURING CO., LTD., Kyoto (JP)

(72) Inventors: Yuki Niwata, Kyoto (JP); Asuki Yanagihara, Kyoto (JP); Yosuke Hosoya, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 758 days.

(21) Appl. No.: 17/147,010

(22) Filed: Jan. 12, 2021

(65) Prior Publication Data

US 2021/0143435 A1 May 13, 2021

Related U.S. Application Data

(63) Continuation of application No. PCT/JP2019/027746, filed on Jul. 12, 2019.

(30) Foreign Application Priority Data

Jul. 13, 2018 (JP) .................................. 2018-133755

(51) Int. Cl.
*H01M 4/66* (2006.01)
*H01M 4/02* (2006.01)
(Continued)

(52) U.S. Cl.
CPC ........... *H01M 4/661* (2013.01); *H01M 4/131* (2013.01); *H01M 4/134* (2013.01); *H01M 4/505* (2013.01);
(Continued)

(58) Field of Classification Search
CPC ...... H01M 4/661; H01M 4/131; H01M 4/134; H01M 4/505; H01M 4/0525;
(Continued)

(56) References Cited

U.S. PATENT DOCUMENTS

| | | | | |
|---|---|---|---|---|
| 2010/0285366 A1* | 11/2010 | Endoh | ..................... | H01M 4/13 429/231.95 |
| 2015/0221943 A1* | 8/2015 | Nishioka | ............... | H01M 4/505 429/223 |

FOREIGN PATENT DOCUMENTS

| | | |
|---|---|---|
| JP | 2010-262826 A | 11/2010 |
| JP | 2014-007034 A | 1/2014 |

(Continued)

OTHER PUBLICATIONS

Sun et al., "On the fragmentation of active material secondary particles in lithium ion battery cathodes induced by charge cycling", Extreme Mechanics Letters, 2016, Elsevier, 9, 449-458. (Year: 2016).*

(Continued)

*Primary Examiner* — Brian R Ohara
*Assistant Examiner* — Michelle T Leonard
(74) *Attorney, Agent, or Firm* — K&L Gates LLP

(57) ABSTRACT

Provided is a nonaqueous electrolyte secondary battery including a positive electrode, a negative electrode, and an electrolyte. The positive electrode includes positive active material particles having a layered rock salt type crystal structure. A filling ratio of the positive active material particles in the positive electrode is 85% or more. The positive active material particles include broken particles in which a longest diameter is within a range from 15 μm to 30 μm. A crack with a length ⅕ times or more and ⅓ times or less the longest diameter of the broken particles is present. The crack has an intersection, and an abundance ratio x of broken particle is 20% or less.

11 Claims, 2 Drawing Sheets

(51) Int. Cl.
    *H01M 4/131*     (2010.01)
    *H01M 4/134*     (2010.01)
    *H01M 4/505*     (2010.01)
    *H01M 4/525*     (2010.01)
    *H01M 10/0525*     (2010.01)

(52) U.S. Cl.
    CPC ....... *H01M 4/525* (2013.01); *H01M 10/0525* (2013.01); *H01M 2004/027* (2013.01); *H01M 2004/028* (2013.01)

(58) Field of Classification Search
    CPC ....... H01M 10/0525; H01M 2004/027; H01M 2004/028
    See application file for complete search history.

(56) References Cited

FOREIGN PATENT DOCUMENTS

| | | |
|---|---|---|
| JP | 2014-132527 A | 7/2014 |
| WO | 2014/155990 A1 | 10/2014 |
| WO | 2015/045719 A1 | 4/2015 |

OTHER PUBLICATIONS

International Search Report issued in connection with PCT/JP2019/027746, mailed Oct. 8, 2019.

\* cited by examiner

NONAQUEOUS ELECTROLYTE SECONDARY BATTERY

CROSS REFERENCE TO RELATED APPLICATIONS

The present application is a continuation of PCT patent application no. PCT/JP2019/027746, filed on Jul. 12, 2019, which claims priority to Japanese patent application no. JP2018-133755 filed on Jul. 13, 2018, the entire contents of which are being incorporated herein by reference.

BACKGROUND

The present technology generally relates to a nonaqueous electrolyte secondary battery.

Nonaqueous electrolyte secondary batteries have a higher voltage and a high energy density as compared to other battery systems, and are therefore widely used in portable information terminals, electric tools, electric vehicles, stationary power storage systems and the like. On the other hand, many studies are being conducted for the purpose of further improving the performance and expanding the uses of nonaqueous electrolyte secondary batteries. For example, an attempt has been made to enhance the energy density by increasing the charge voltage or increasing the filling ratio of a positive active material in a positive electrode.

SUMMARY

The present technology generally relates to a nonaqueous electrolyte secondary battery.

In recent years, a technology has been desired which enables good charge-discharge cycle characteristics to be obtained. In particular, for nonaqueous electrolyte secondary batteries whose energy density is enhanced in the manner described above, a technique has been desired which enables good charge-discharge cycle characteristics to be obtained.

An object of the present technology is to provide a nonaqueous electrolyte secondary battery which enables good charge-discharge cycle characteristics to be obtained.

According to an embodiment of the present technology, a nonaqueous electrolyte secondary battery is provided. The nonaqueous electrolyte secondary battery includes a positive electrode, a negative electrode, and an electrolyte. The positive electrode includes positive active material particles having a layered rock salt type crystal structure, a filling ratio of the positive active material particles in the positive electrode is 85% or more, the positive active material particles include broken particles in which a longest diameter is within a range from 15 µm to 30 µm, a crack with a length ⅕ times or more and ⅓ times or less the longest diameter of the broken particles is present, the crack has an intersection, and a broken particle abundance ratio x is more than 0% and 20% or less.

According to the present technology, good charge-discharge cycle characteristics can be obtained.

The effect described in the present disclosure is merely an example and is not restrictive, and an additional effect may be provided.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
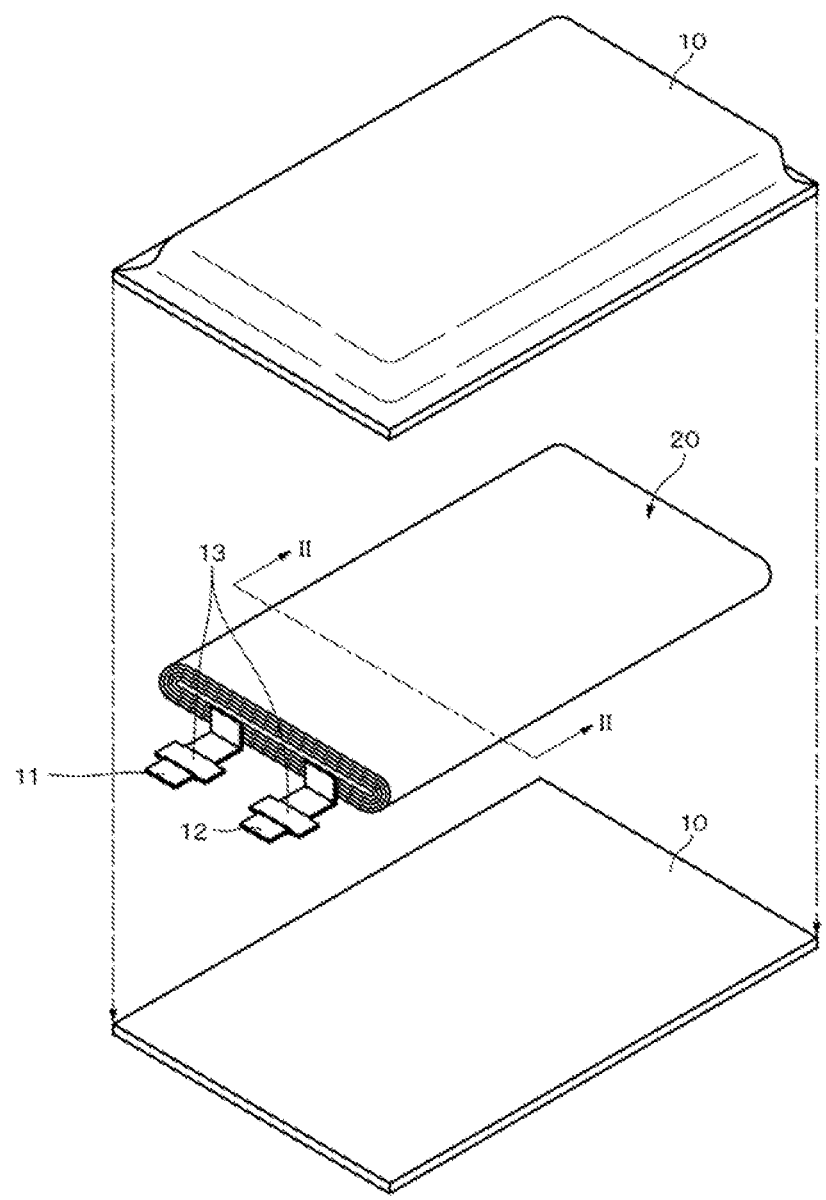
FIG. 1 is an exploded perspective view showing an example of a configuration of a nonaqueous electrolyte secondary battery according to an embodiment of the present technology.

FIG. 1 shows an example of a battery configuration according to a first embodiment of the present technology. The battery according to the first embodiment is a so-called laminated battery, in which an electrode body 20 provided with a positive electrode lead 11 and a negative electrode lead 12 is housed in a film-shaped exterior material 10, so that the battery can be downsized, made lighter in weight, and thinned.

The positive electrode lead 11 and the negative electrode lead 12 are led out, for example in the same direction, from the inside of the exterior material 10 to the outside. The positive electrode lead 11 and the negative electrode lead 12 are each formed of a metallic material such as Al, Cu, Ni or stainless steel, and each have a thin plate shape or a netlike shape.

The exterior material 10 is formed of, for example, a rectangular aluminum laminate film in which a nylon film, an aluminum foil and a polyethylene film are bonded in this order. The exterior material 10 is disposed in such a manner that the polyethylene film and the electrode body 20 face each other, and the outer edge portions thereof are brought into close contact with each other by welding or with an adhesive. An adhesion film 13 for preventing ingress of outside air is inserted between the exterior material 10 and the positive electrode lead 11 and negative electrode lead 12. The adhesion film 13 is formed of a material having adhesion to the positive electrode lead 11 and the negative electrode lead 12, for example a polyolefin resin such as polyethylene, polypropylene, modified polyethylene or modified polypropylene.

Instead of the above-described aluminum laminate film, a laminate film having another structure, a polymer film of polypropylene or the like, or a metal film may form the exterior material 10. Alternatively, the exterior material may be formed of a laminate film in which a polymer film is laminated on one surface or both surfaces of an aluminum film used as a core material.

Figure 2:
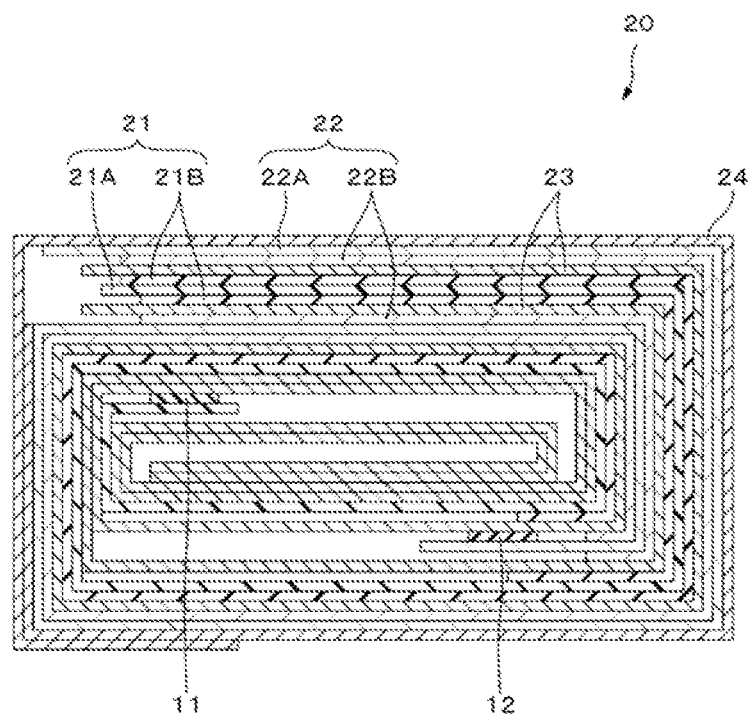
FIG. 2 is a sectional view taken along line II-II of FIG. 1.

FIG. 2 is a sectional view taken along line II-II of the electrode body 20 shown in FIG. 1. The electrode body 20 is a winding-type electrode body having a configuration in which a long positive electrode 21 and negative electrode 22 are laminated with a long separator 23 interposed therebetween, and the laminate is wound in a flat shape and a spiral shape. The outermost peripheral portion is protected with a protective tape 24. An electrolytic solution as an electrolyte is injected into the exterior material 10 to impregnate the positive electrode 21, the negative electrode 22, and the separator 23.

Hereinafter, the positive electrode 21, the negative electrode 22, the separator 23, and the electrolytic solution forming the battery will be described in order.

The positive electrode 21 includes a positive electrode current collector 21A, and a positive active material layer 21B provided on both surfaces of the positive electrode current collector 21A. The positive electrode current collector 21A is formed of, for example, a metal foil such as an aluminum foil, a nickel foil or a stainless steel foil. The positive active material layer 21B contains a positive active material. The positive active material layer 21B may further contain at least one of a binder and a conductive agent if necessary.

The positive active material includes first positive active material particles having a longest diameter $d_1$ of 15 μm or more (hereinafter, simply referred to as "first particles"). Further, the positive active material can include second positive active material particles having a longest diameter $d_2$ of less than 15 μm (hereinafter, simply referred to as "second particles"). The positive active material contains the first particles and the second particles, and thus when a positive mixture slurry is applied to the positive electrode current collector 21A and dried in the step of preparing the positive electrode 21, second particles enter gaps between the first particles, so that the filling property of the positive electrode 21 can be improved. In the present specification, the "longest diameter $d_1$" and the "longest diameter $d_2$" mean the largest of distances between two parallel lines drawn from all angles so as to contact the contours of the first particle and the second particle, respectively (so called a maximum ferret diameter).

The positive mixture slurry contains a binder or a conductive assistant, and at least a part of the surfaces of the first and second particles are coated with these materials. Therefore, problems caused by cracks as described later are unlikely to occur. Since at least a part of the surface of each particle is coated, these materials can be present between the first particles and the second particles.

The longest diameter $d_1$ of the first particle is preferably in the range of 15 μm or more and 30 μm or less, more preferably 18 μm or more and 25 μm or less. When the longest diameter $d_1$ of the first particle is 15 μm or more and 30 μm or less, the cycle characteristics can be particularly improved.

The longest diameter $d_2$ of the second particle is preferably in the range of 2 μm or more and 10 μm or less, more preferably 2 μm or more and 7 μm or less. When the longest diameter $d_2$ of the second particle is 2 μm or more and 10 μm or less, the filling property can be particularly improved. The second particles may be obtained in the following manner: particles meeting the longest diameter $d_2$ are prepared in advance, and mixed in the step of preparing the positive electrode 21, or first particles or particles larger in longest diameter than the first particles are broken in the step of preparing the positive electrode 21.

The abundance ratio x of broken particles is more than 0% and 20% or less, preferably more than 2% and 20% or less, more preferably more than 2% and 15% or less, still more preferably more than 2% and 10% or less, particularly preferably more than 2% and 5% or less. If the abundance ratio x of broken particles is more than 20%, progress of breakage of broken particles due to repetition of charge-discharge makes it impossible to maintain a good conductive path as the entire positive active material, so that good charge-discharge cycle characteristics cannot be obtained. On the other hand, it is not easy to prepare the first particles in which the abundance ratio x of broken particle is 0%, and in the step of preparing the positive electrode 21 described later, broken particles may be generated in the first particles in compression molding of the positive electrode 21 by a roll press machine or the like. In particular, if the press pressure during compression molding is increased for enhancing the filling ratio of the positive active material in the positive active material layer 21B, broken particles are easily generated in the first particles. Therefore, if the abundance ratio x of broken particle is 2% or less, the positive electrode 21 has a low filling property, and a small number of contact points, so that the initial resistance value of the battery increases, and cycle characteristics are easily deteriorated.

Here, the term "broken particles" means first particles in which the longest diameter is within the range of 15 μm or more and 30 μm or less, a crack with a length ⅕ times or more and ⅓ times or less the longest diameter $d_1$ of the particles is present, and the crack has an intersection P. The above-described problem expands when the crack has an origination point on the outer edge of the particle, and the above-described problem further expands when the crack 31 has both an origination point and an end point on the outer edge of the particle. This is because presence of such an origination point and end point expands division of particles, so that it is difficult to secure a conductive path. A method for calculating the abundance ratio x of broken particle is described in examples.

The abundance ratio y of cracked particle is preferably more than 0% and 50% or less, more preferably more than 2% and 50% or less, still more preferably more than 2% and 30% or less, particularly preferably more than 2% and 15% or less, most preferably more than 2% and 5% or less. When the abundance ratio y of cracked particle is 50% or less, a good conductive path can be maintained as the entire positive active material even if the length and the width of the crack of cracked particles increase due to repetition of charge-discharge, so that better charge-discharge cycle characteristics can be obtained. On the other hand, it is not easy to prepare the first particles in which the abundance ratio y of cracked particle is 0%, and in the step of preparing the positive electrode 21 described later, cracked particles may be generated in the first particles in compression molding of the positive electrode 21 by a roll press machine or the like. In particular, if the press pressure during compression molding is increased for enhancing the filling ratio of the positive active material in the positive active material layer 21B, cracked particles are easily generated in the first particles. Therefore, if the abundance ratio y of cracked particle is 2% or less, the positive electrode 21 has a low filling property, and a small number of contact points, so that the initial resistance value of the battery increases, and cycle characteristics are easily deteriorated.

Here, the term "cracked particles" means first particles in which the longest diameter is within the range of 15 μm or more and 30 μm or less, a crack with a length ⅕ times or more and ⅓ times or less the longest diameter $d_1$ of the particles is present, and the crack has no intersection P. A method for calculating the abundance ratio y of cracked particle is described in examples.

The broken particles and cracked particles mentioned here are not secondary particles but primary particles. The size of the crystallite contained in the primary particle is preferably 200 nm or more and 1500 μm or less, particularly preferably 500 nm or more and 1200 μm or less. The number of crystallites contained in the primary particle is preferably 1 or more and 20 or less, particularly preferably 1 or more and 10 or less. When the above-described range is satisfied, cycle characteristics can be improved.

The states of cracks are generally the same as long as the number of charge-discharge cycles of the battery is 300 or less, and the states of cracks in preferably 200 cycles or less, more preferably 100 cycles or less, still more preferably 50 cycles or less are observed.

From the viewpoint of improving the energy density, the lower limit of the filling ratio of the positive active material in the positive active material layer 21B is preferably 85% or more, more preferably 90% or more, still more preferably 95% or more. The upper limit of the filling ratio of the positive active material in the positive active material layer 21B is preferably 99% or less, more preferably 97% or less. When the upper limit of the filling ratio is 99% or less, it is possible to suppress deterioration of impregnability of the electrolytic solution due to a decrease in the number of gaps in the positive active material layer 21B.

The mass ratio (A/B) of the first particle A to the second particle B is preferably 60/40 or more and 95/5 or less from the viewpoint of improving the filling ratio of the positive active material in the positive active material layer 21B.

Positive active material particles having a particle diameter in the range of 2 μm or more and 10 μm or less (hereinafter, appropriately referred to as "fine particles") are present in an amount of preferably 5 vol % or more and 40 vol % or less based on the total mass of positive active material. When the amount of fine particles is within the above-mentioned range, the filling ratio of the positive active material in the positive active material layer 21B is enhanced, so that higher cycle characteristics can be expected.

The first and second particles are lithium transition metal composite oxides capable of absorbing and releasing lithium that is an electrode reactant, and having a layered rock salt type crystal structure. The compositions of the first particle and the second particle may be the same, or different.

It is preferable that the average compositions of the first particle and the second particle be each independently represented by the following formula (A):

  (A)

wherein, w is more than 0.8 and less than 1.2, x+y is more than 0.9 and less than 1.1, y is 0 or more and less than 0.1, and z is 0 or more and less than 0.05; M is at least one selected from the group consisting of Co, Ni and Mn; N is at least one selected from the group consisting of Ti, V, Cr, Mn, Fe, Cu, Na, Mg, Al, Si, K, Ca, Zn, Ga, Sr, Y, Zr, Nb, Mo, Ba, La, W and Bi; and X is at least one selected from the group consisting of F, Cl and S.

It is preferable that the average compositions of the first particle and the second particle be each independently represented by the following formula (B):

  (B)

wherein a is more than 0.8 and less than 1.2, b is 0 or more and less than 0.15, and c is 0 or more and less than 0.05; R is at least one selected from the group consisting of Ti, V, Cr, Mn, Fe, Ni, Mn, Cu, Na, Mg, Al, Si, K, Ca, Zn, Ga, Sr, Y, Zr, Nb, Mo, Ba, La and W; and Y is at least one selected from the group consisting of F, Cl and S.

The first particles present at the boundary portion between the positive electrode current collector 21A and the positive active material layer 21B may be embedded in a surface of the positive electrode current collector 21A. The state of embedment is not particularly limited. A part of the surfaces of the first particles may be embedded in the surface of the positive electrode current collector 21A, or almost the whole of the surfaces of the first particles may be embedded in the surface of the positive electrode current collector 21A. For ensuring that the filling ratio of the positive active material particles in the positive electrode 21 is 85% or more, it is preferable to increase the press pressure during compression molding to the extent that the first particles are embedded in the surface of the positive electrode current collector 21A.

It is particularly effective that the definition of the above-described upper limits of the broken particle abundance ratio x and the cracked particle abundance ratio y is applied to a battery in which the filling ratio of positive active material particles is 85% or more, i.e. a state in which the first particles are embedded in the surface of the positive electrode current collector 21A. This is because the broken particle abundance ratio x and the abundance ratio y of cracked particles tend to increase when the press pressure during compression molding is increased.

As the binder, at least one selected from resin materials such as polyvinylidene fluoride, polytetrafluoroethylene, polyacrylonitrile, styrene butadiene rubber and carboxymethyl cellulose, and copolymers mainly containing any of these resin materials as a main component is used.

As the conductive agent, for example, at least one carbon material selected from the group consisting of graphite, carbon fiber, carbon black, Ketjen black, carbon nanotubes and the like is used. The conductive agent may be any material having conductivity, and is not limited to the carbon material. For example, a metallic material, a conductive polymer material or the like may be used as the conductive agent.

The negative electrode 22 includes, for example, a negative electrode current collector 22A and a negative active material layer 22B provided on both surfaces of the negative electrode current collector 22A. The negative electrode current collector 22A is formed of, for example, a metal foil such as a copper foil, a nickel foil or a stainless steel foil.

The negative active material layer 22B contains one or more negative electrode active materials capable of absorbing and releasing lithium. The negative active material layer 22B may further contain at least one of a binder and a conductive agent if necessary.

In this battery, the electrochemical equivalent of the negative electrode 22 or the negative active material is larger than the electrochemical equivalent of the positive electrode 21, and theoretically, it is preferable that lithium metal does not precipitate on the negative electrode 22 during charge.

Examples of the negative active material include carbon materials such as hardly graphitizable carbon, easily graphitizable carbon, graphite, thermally decomposed carbons, cokes, glassy carbons, organic polymer compound fired products, carbon fiber and activated carbon. Of these, the cokes include pitch coke, needle coke and petroleum coke. The organic polymer compound fired product is a material obtained by firing a polymer material such as a phenol resin or a furan resin at an appropriate temperature into carbon, a part of which is classified as hardly graphitizable carbon or easily graphitizable carbon. Such carbon materials are preferable because a change in crystal structure generated during charge-discharge is very small, and it is possible to obtain a high charge-discharge capacity and good cycle characteristics. In particular, graphite is preferable because it has a large electrochemical equivalent, and a high energy density can be obtained. Graphitizable carbon is preferable because excellent cycle characteristics can be obtained.

Further, materials having a low charge-discharge potential, specifically materials having a charge-discharge potential close to that of lithium metal, are preferable because the energy density of the battery can be easily enhanced.

Examples of other negative active materials capable of enhancing the capacity include materials containing at least one of metal elements and semimetal elements as constituent elements (e.g. an alloy, a compound or a mixture). This is because when such a material is used, a high energy density can be obtained. In particular, it is preferable to use the negative active material together with a carbon material because it is possible to obtain high energy density and excellent cycle characteristics. In the present technology, the alloys include those including two or more metal elements, and those including one or more metal elements and one or more semimetal elements. The alloys may include nonmetal elements. Some of the structures thereof are solid solutions, eutectics (eutectic mixtures), intermetallic compounds, or materials in which two or more thereof coexist.

Examples of such negative active materials include metal elements and semimetal elements which are capable of forming an alloy with lithium. Specific examples include Mg, B, Al, Ti, Ga, In, Si, Ge, Sn, Pb, Bi, Cd, Ag, Zn, Hf, Zr, Y, Pd and Pt. These materials may be crystalline or amorphous.

The negative active material is preferably one containing a metal element or a semimetal element of Group 4B in the short periodic table as a constituent element, more preferably one containing at least one of Si and Sn as a constituent element. This is because Si and Sn have a high ability to absorb and release lithium, so that a high energy density can be obtained. Examples of such negative active materials include a simple substance of Si, or alloys or compounds thereof, a simple substance of Sn, or alloys or compounds thereof, and materials having one or more thereof at a part.

Examples of Si alloys include those containing at least one selected from the group consisting of Sn, Ni, Cu, Fe, Co, Mn, Zn, In, Ag, Ti, Ge, Bi, Sb, Nb, Mo, Al, P, Ga and Cr as second constituent elements other than Si. Examples of Sn alloys include those containing at least one selected from the group consisting of Si, Ni, Cu, Fe, Co, Mn, Zn, In, Ag, Ti, Ge, Bi, Sb, Nb, Mo, Al, P, Ga and Cr as second constituent elements other than Sn.

Examples of Sn compounds or Si compounds include those containing O or C as constituent elements. These compounds may contain the second constituent element.

In particular, the Sn-based negative active material is preferably one containing Co, Sn and C as constituent elements and having low crystallinity or an amorphous structure.

Examples of other negative active materials include metal oxides or polymer compounds capable of absorbing and releasing lithium. Examples of the metal oxide include lithium titanium oxide containing Li and Ti, such as lithium titanate ($Li_4Ti_5O_{12}$), iron oxide, ruthenium oxide and molybdenum oxide.

Examples of the polymer compound include polyacetylene, polyaniline and polypyrrole.

As the binder, the same material as that of the positive active material layer 21B can be used.

As the conductive agent, the same material as that of the positive active material layer 21B can be used.

The separator 23 separates the positive electrode 21 and the negative electrode 22, and allows lithium ions to pass through the separator while preventing a short-circuit of current due to contact between the two electrodes. The separator 23 includes a porous film formed of polytetrafluoroethylene, polyolefin resin (polypropylene (PP), polyethylene (PE) or the like), acrylic resin, styrene resin, polyester resin or nylon resin, or a resin obtained by blending these resins, and may have a structure in which two or more of these porous films are laminated.

Of these, polyolefin porous films are preferable because they are excellent in short-circuit prevention effect, and enable improvement of safety of batteries by a shutdown effect. In particular, polyethylene is preferable as a material forming the separator 23 because polyethylene can exhibit a shutdown effect in the range of 100° C. or higher and 160° C. or lower, and is excellent in electrochemical stability. Of these, low-density polyethylene, high-density polyethylene and linear polyethylene are preferably used because such polyethylene has an appropriate melting temperature, and is easy to obtain. In addition, a material obtained by copolymerizing or blending a resin having chemical stability with polyethylene or polypropylene can be used.

Alternatively, the porous film may have a structure of three or more layers in which a polypropylene layer, a polyethylene layer, and a polypropylene layer are laminated in this order. For example, it is desirable that the porous film have a three-layer structure, PP/PE/PP, in which the mass ratio of PP to PE is PP:PE=60:40 to 75:25.

Alternatively, from the viewpoint of cost, a single-layer substrate having 100 wt % PP or 100 wt % PE can be used. The method for preparing the separator 23 may be of either wet type or dry type.

As the separator 23, a nonwoven fabric may be used. As the fiber forming the nonwoven fabric, aramid fiber, glass fiber, polyolefin fiber, polyethylene terephthalate (PET) fiber, nylon fiber or the like can be used. Two or more of these fibers may be mixed to form a non-woven fabric.

The separator 23 may have a structure in which the separator includes a substrate, and a surface layer provided on one or both surfaces of the substrate. The surface layer includes inorganic particles having electric insulation quality, and a resin material binding inorganic particles to a surface of the substrate and binding inorganic particles. For example, this resin material may be fibrillated so as to have a three-dimensional network structure in which a plurality of fibrils are connected. The inorganic particles are supported on a resin material having the three-dimensional network structure. The resin material may bind a surface of the substrate and inorganic particles rather than being fibrillated. In this case, a higher binding property can be obtained. By providing a surface layer on one or both surfaces of the substrate as described above, the oxidation resistance, the heat resistance and the mechanical strength of the separator 23 can be enhanced.

The substrate is a porous film which is permeable to lithium ions and is formed of an insulating film having predetermined mechanical strength. It is preferable that the substrate have high resistance to an electrolytic solution and low reactivity and hardly expand because the electrolytic solution is held in voids of the substrate.

As a material forming the substrate, the resin material or the nonwoven fabric forming the separator 23 can be used.

The inorganic particle includes at least one selected from the group consisting of metal oxides, metal nitrides, metal carbides, metal sulfides and the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) or the like can be preferably used. As the metal nitride, silicon nitride ($Si_3N_4$), aluminum nitride (AlN), boron nitride (BN), titanium nitride (TiN) or the like can be used. As the metal carbide, silicon carbide (SiC), boron carbide ($B_4C$) or the like can be preferably used. As the metal sulfide, barium sulfate ($BaSO_4$) or the like can be preferably used. Of the above-described metal oxides, alumina, titania (particularly those having a rutile-type structure), silica or magnesia are preferably used, and alumina is more preferably used.

The inorganic particle may contain a mineral such as a porous aluminosilicate such as zeolite ($M_{2/a}O \cdot Al_2O_3 \cdot xSiO_2 \cdot yH_2O$, where M is a metal element, $x \geq 2$, $y \geq 0$), a layered silicate, barium titanate ($BaTiO_3$) or strontium titanate ($SrTiO_3$). The inorganic particles have oxidation resistance and heat resistance, so that a surface layer on a lateral surface opposite to the positive electrode, which contains the inorganic particles, has strong resistance to an oxidizing environment in the vicinity of the positive electrode during charge. The shape of the inorganic particles is not particularly limited, and may have any of a spherical shape, plate shape, a fibrous shape, a cubic shape and a random shape.

The particle size of the inorganic particles is preferably in the range of 1 nm or more and 10 μm or less. This is because if the particle size is smaller than 1 nm, it is difficult to obtain the inorganic particles, and if the particle size is larger than 10 μm, the distance between electrodes increases, it is impossible to obtain a sufficient active material loading amount with a limited space, leading to a decrease in battery capacity.

Examples of the resin material forming the surface layer include fluorine-containing resins such as polyvinylidene fluoride and polytetrafluoroethylene; fluorine-containing rubbers such as vinylidene fluoride-tetrafluoroethylene copolymers and ethylene-tetrafluoroethylene copolymers; rubbers such as styrene-butadiene copolymers or hydrides thereof, acrylonitrile-butadiene copolymers or hydrides thereof, acrylonitrile-butadiene-styrene copolymers or hydrides thereof, methacrylic acid ester-acrylic acid ester copolymers, styrene-acrylic acid ester copolymers, acrylonitrile-acrylic acid ester copolymers, ethylene propylene rubber, polyvinyl alcohol and polyvinyl acetate; cellulose derivatives such as ethyl cellulose, methyl cellulose, hydroxyethyl cellulose and carboxymethyl cellulose; and resins whose melting point and/or glass transition temperature are 180° C. or higher, such as polyphenylene ether, polysulfone, polyether sulfone, polyphenylene sulfide, polyether imide, polyimide, polyamide such as totally aromatic polyamide (aramid), polyamideimide, polyacrylonitrile, polyvinyl alcohol, polyether, acrylic acid resins and polyester. One of these resin materials may be used alone, or two or more thereof may be used in combination. In particular, fluorine-based resins such as polyvinylidene fluoride are preferable from the viewpoint of oxidation resistance and flexibility, and it is preferable that the resin material contain aramid or polyamideimide.

As a method for forming a surface layer, for example, a method can be used in which a slurry formed of a matrix resin, a solvent and inorganic particles is applied onto a substrate (porous film), subjected to phase separation by passing through a baths containing a poor solvent for matrix resin and an affinity solvent for the poor solvent, and then dried.

The porous film as a substrate may contain the above-described inorganic particles. The surface layer may be free of inorganic particles, and formed only of a resin material.

The electrolytic solution is a so-called nonaqueous electrolytic solution, and contains an organic solvent (nonaqueous solvent) and an electrolyte salt dissolved in the organic solvent. The electrolytic solution may contain known additives for improving battery characteristics. Instead of electrolytic solution, an electrolyte layer containing an electrolytic solution and a polymer compound serving as a holding material which holds the electrolytic solution may be used. In this case, the electrolyte layer may be in the form of a gel.

As the organic solvent, a cyclic carbonate such as ethylene carbonate or propylene carbonate can be used, and it is preferable to use one of ethylene carbonate and propylene carbonate, particularly both thereof, in combination. This is because cycle characteristics can be further improved.

It is preferable that in addition to the above-mentioned cyclic carbonates, a chain carbonate such as diethyl carbonate, dimethyl carbonate, ethylmethyl carbonate or methylpropyl carbonate be used in combination as the organic solvent. This is because high ionic conductivity can be obtained.

It is preferable that 2,4-difluoroanisole or vinylene carbonate be further present as the organic solvent. This is because 2,4-difluoroanisole can further improve the discharge capacity, and vinylene carbonate can further improve cycle characteristics. Therefore, it is preferable that these organic solvents be used in combination because the discharge capacity and cycle characteristics can be further improved.

Examples of organic solvents other than those mentioned above include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide and trimethyl phosphate.

A compound in which at least a part of hydrogen of such an organic solvent is substituted with fluorine may be preferable because it may be possible to improve the reversibility of electrode reaction depending on the type of an electrode to be combined.

Examples of the electrolyte salt include lithium salts, and one of the lithium salts may be used alone, or two or more thereof may be used in combination. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$ and difluoro[oxalato-O, O'].

Examples thereof include lithium borate, lithium bisoxalate borate, and LiBr. Of these, $LiPF_6$ is preferable because high ionic conductivity can be obtained, and cycle characteristics can be further improved.

When the battery having the above-described configuration is charged, for example, lithium ions are released from the positive active material layer 21B, and absorbed into the negative active material layer 22B via the electrolytic solution. When the battery is discharged, for example, lithium ions are released from the negative active material layer 22B, and absorbed into the positive active material layer 21B via the electrolytic solution.

Next, an example of a method for producing a battery according to the first embodiment of the present technology will be described.

The positive electrode 21 was prepared in the following manner. First, for example, a positive active material containing first particles and second particles, a conductive agent, and a binder are mixed to prepare a positive mixture, and this positive mixture is dispersed in a solvent such as N-methyl-2-pyrrolidone (NMP) to prepare a paste-like positive mixture slurry. Next, this positive mixture slurry is applied to the positive electrode current collector 21A, the solvent is removed by drying, and the positive active material layer 21B is formed by compression molding with a roll press machine or the like to obtain the positive electrode 21. For improving the filling ratio of the positive active material particles in the positive electrode 21, it is preferable that the press pressure during compression molding be such that the first particles are embedded in the surface of the positive electrode current collector 21A.

The negative electrode 22 is prepared in the following manner. First, for example, a negative active material and a binder are mixed to prepare a negative mixture, and this negative mixture is dispersed in a solvent such as N-methyl-2-pyrrolidone to prepare a paste-like negative mixture slurry.

Next, this negative mixture slurry is applied to the negative electrode current collector 22A, the solvent is removed by drying, and the negative active material layer 22B is formed by compression molding with a roll press machine or the like to obtain the negative electrode 22.

The winding-type electrode body 20 is manufactured as follows. First, the positive electrode lead 11 is attached to one end of the positive electrode current collector 21A by welding, and the negative electrode lead 12 is attached to one end of the negative electrode current collector 22A by welding. Next, the positive electrode 21 and the negative electrode 22 are wound around a flat winding core with the separator 23 interposed therebetween, the laminate is wound multiple times in the longitudinal direction, and a protective tape 24 is bonded to the outermost peripheral portion to obtain the electrode body 20.

The electrode body 20 is encapsulated with the exterior material 10 in the following manner. First, the electrode body 20 is sandwiched between exterior materials 10, the exterior materials 10 are heat-sealed at the outer peripheral edge portion except for one side to form a bag, and the electrode body 20 is stored inside the exterior materials 10.

At that time, the adhesion film 13 is inserted between the positive electrode lead 11 and negative electrode lead 12 and the exterior material 10. The adhesion film 13 may be attached to the positive electrode lead 11 and the negative electrode lead 12 in advance.

Next, the electrolytic solution is injected to the inside of the exterior materials 10 from the unsealed side, and the exterior materials are heat-sealed at the unsealed side in a vacuum atmosphere to hermetically seal the electrolytic solution. In this way, the battery shown in FIGS. 1 and 2 can be obtained.

In the battery according to the first embodiment, the positive active material layer 21B contains positive active material particles having a layered rock salt type crystal structure, the filling ratio of the positive active material particles in the positive active material layer 21B is 85% or more, the positive active material particles include broken particles in which the longest diameter is within the range of 15 μm or more and 30 μm or less, a crack with a length 1/5 times or more and 1/3 times or less the longest diameter of the particles is present, and the crack has an intersection, and the abundance ratio x of broken particle is more than 0% and 20% or less. This enables good charge-discharge cycle characteristics to be obtained. The above-described effect can be obtained even in batteries whose energy density is enhanced by increasing the charge voltage or increasing the filling ratio of the positive active material in the positive electrode.

The positive electrode potential (vs Li/Li$^+$) in a fully charged state is preferably more than 4.20 V, more preferably 4.25 V or more, still more preferably 4.40 V or more, particularly preferably 4.45 V or more, most preferably 4.50 V or more. Even in such a battery with a high charge voltage, good charge-discharge cycle characteristics can be obtained. The upper limit of the positive electrode potential (vs Li/Li$^+$) in a fully charged state is not particularly limited, and is preferably 6 V or less, more preferably 4.6 V or less.

In the second embodiment, the electronic device including the battery according to the first embodiment will be described.

Figure 3:
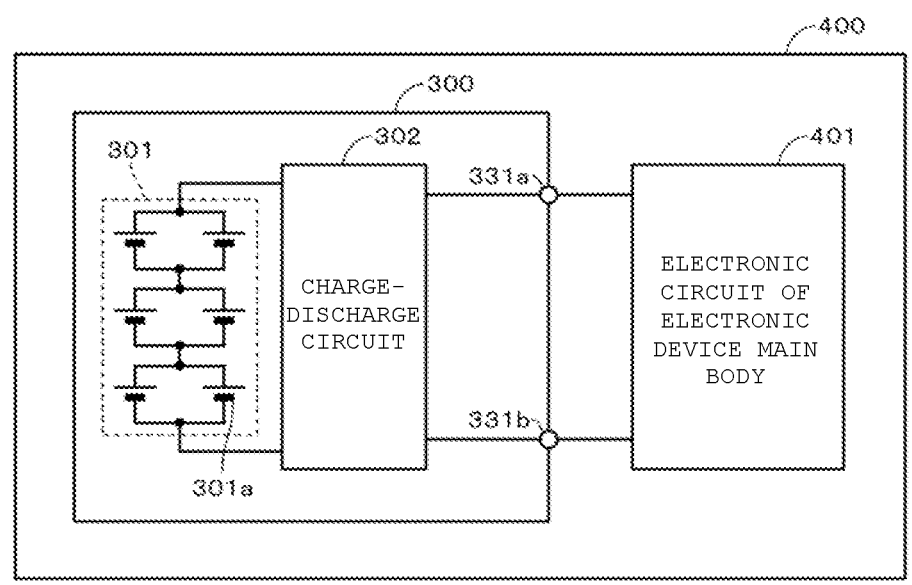
FIG. 3 is a block diagram showing an example of a configuration of an electronic device according to an embodiment of the present technology.

FIG. 3 shows an example of a configuration of an electronic device 400 according to the second embodiment of the present technology. The electronic device 400 includes an electronic circuit 401 of the electronic device main body and a battery pack 300. The battery pack 300 is electrically connected to an electronic circuit 401 via a positive electrode terminal 331a and a negative electrode terminal 331b. The electronic device 400 may have a configuration which enables the battery pack 300 to be detached.

Examples of the electronic device 400 include, but are not limited to, notebook personal computers, tablet computers, mobile phones (e.g. smartphones), personal digital assistants (PDAs), display devices (LCDs (liquid crystal displays), ELs (electro luminescence) displays, electronic papers and the like)), imaging devices (e.g. digital still cameras, digital video cameras and the like), audio equipment (e.g. portable audio players), game equipment, cordless phone handsets, electronic books, electronic dictionaries, radios, headphones, navigation systems, memory cards, pacemakers, hearing aids, power tools, electric shavers, refrigerators, air conditioners, TVs, stereos, water heaters, microwave ovens, dishwashers, washing machines, dryers, lighting equipment, toys, medical equipment, robots, road conditioners, and traffic lights.

The electronic circuit 401 includes, for example, a CPU (central processing unit), a peripheral logic unit, an interface unit, a storage unit and the like, and controls the entire electronic device 400.

The battery pack 300 includes an assembled battery 301 and a charge-discharge circuit 302. The battery pack 300 may further include an exterior material (not shown) that houses an assembled battery 301 and a charge-discharge circuit 302 if necessary.

The assembled battery 301 is formed by connecting a plurality of secondary batteries 301a in series and/or in parallel. A plurality of secondary batteries 301a are connected, for example, in parallel in n rows and in series in m lines (n and m are positive integers). FIG. 3 shows an example in which six secondary batteries 301a are connected in parallel in two rows and in series in three lines (2P3S). As the secondary battery 301a, the battery according to the first embodiment is used.

Here, the battery pack 300 including an assembled battery 301 including a plurality of secondary batteries 301a will be described, and a configuration may be employed in which the battery pack 300 includes one secondary battery 301a instead of the assembled battery 301.

The charge-discharge circuit 302 is a control unit that controls charge-discharge of the assembled battery 301. Specifically, during charge, the charge-discharge circuit 302 controls charge of the assembled battery 301. On the other hand, during discharge (during use of the electronic device 400), the charge-discharge circuit 302 controls discharge to the electronic device 400.

As the exterior material, for example, a case formed of a metal, a polymer resin, a composite material thereof or the like can be used. Examples of the composite material include a laminates in which a metal layer and a polymer resin layer are laminated.

EXAMPLES

Hereinafter, the present technology will be described in detail with reference to examples, which should not be construed to limit the present technology.

Examples 1 and 2 and Comparative Example 1

(Step (1-1))

As first particles A, LiCoO$_2$ particles were obtained in the following manner. First, commercially available lithium carbonate and cobalt oxide (average particle diameter: 15 μm) were mixed to a molar ratio of Li:Co of 1.02:1.00, and the mixture was fired in the air at 1000° C. for 6 hours, and slowly cooled. Thereafter, a grinding step was carried out to obtain $LiCoO_2$ particles having an average particle diameter of 19 μm.

(Step (2))

As second particles B, $LiCoO_2$ particles were obtained in the following manner. First, commercially available lithium carbonate and cobalt oxide (average particle diameter: 5 μm) were mixed to a molar ratio of Li:Co of 1.02:1.00, and the mixture was fired in the air at 1000° C. for 6 hours, and slowly cooled. Next, a grinding step was carried out, and screening was then performed with a sieve with an aperture of 8 μm to obtain $LiCoO_2$ particles having an average particle diameter of 4 μm.

(Step (3))

As shown in Table 1, first particles A were mixed with second particles B to a mass ratio of A:B of 95:5, 85:15 or 70:30 to obtain a positive active material.

Example 3

(Step (1-2))

100 parts by weight of the $LiCoO_2$ particles obtained in (step (1-1)) as first particles A were dispersed in 3000 parts by weight of a 2N lithium hydroxide (LiOH) aqueous solution with stirring at 80° C. for 1 hour. Next, the commercially available reagents of manganese nitrate ($Mn(NO_3)_2 \cdot 6H_2O$) and nickel nitrate ($Ni(NO_3)_2 \cdot 6H_2O$) were mixed with the dispersion solution to a molar ratio of Co, Ni, and Mn of Co:Ni:Mn of 0.99:0.0075:0.0025 to obtain a mixed solution. A solution dissolved in 100 parts by weight of pure water was added over 2 hours. The solution was adjusted to a PH of 12 or more with a NaOH aqueous solution to precipitate a hydroxide. Further, the mixture was dispersed with stirring at 80° C. for 1 hour, and allowed to cool. Next, the dispersion system was filtered, and dried at 120° C. to obtain a precursor. For adjusting the amount of lithium, 100 parts by weight of the precursor sample was impregnated with 150 parts by weight of a 2 N lithium carbonate ($Li_2CO_3$) aqueous solution, and homogeneously mixed and dried to obtain a fired precursor. Next, the fired precursor was heated in an electric furnace at a rate of 5° C. per minute, held at 950° C. for 5 hours, and then cooled to 150° C. at 7° C. per minute. In this way, $LiCo_{0.99}Ni_{0.0075}Mn_{0.0025}O_2$ having an average particle diameter of 20 μm was obtained.

(Steps (2) and (3))

A positive active material was obtained in the same manner as in steps (2) and (3) of Example 1.

Example 4

(Step (1-3))

$LiCo_{0.98}Ni_{0.015}Mn_{0.005}O_2$ particles were obtained in the same manner as in step (1-2) of Example 3 except that mixing was performed to a molar ratio of Co, Ni, and Mn to Co:Ni:Mn=0.98:0.015:0.005.

(Steps (2) and (3))

A positive active material was obtained in the same manner as in steps (2) and (3) of Example 1.

Example 5

(Step (1-4)))

$LiCoO_{1.98}F_{0.02}$ particles were obtained as the first particles A in the following manner. First, commercially available lithium fluoride and cobalt oxide (average particle diameter: 15 μm) were mixed to a molar ratio of Li:Co of 1.02:1.00, and the mixture was fired in the air at 1000° C. for 6 hours, and slowly cooled. Thereafter, a grinding step was carried out to obtain $LiCoO_{1.98}F_{0.02}$ particles having an average particle diameter of 16 μm.

(Steps (2) and (3))

A positive active material was obtained in the same manner as in steps (2) and (3) of Example 1.

Example 6

(Step (1-5))

$LiCoO_{1.95}F_{0.05}$ particles were obtained as the first particles A in the following manner. First, commercially available lithium fluoride and cobalt oxide (average particle diameter: 15 μm) were mixed to a molar ratio of Li:Co of 1.02:1.00, and the mixture was fired in the air at 1000° C. for 8 hours, and slowly cooled. Thereafter, a grinding step was carried out to obtain $LiCoO_{1.95}F_{0.05}$ particles having an average particle diameter of 17 μm.

(Steps (2) and (3))

A positive active material was obtained in the same manner as in steps (2) and (3) of Example 1.

Comparative Example 2

A positive active material was obtained in the same manner as in Example 1 except that $LiCoO_2$ particles having an average particle diameter of 17 μm were obtained while the firing conditions in step (1-1) were changed to a temperature of 900° C. and a firing time of 6 hours.

Comparative Example 3

A positive active material was obtained in the same manner as in Example 1 except that $LiCoO_2$ particles having an average particle diameter of 15 μm were obtained while the firing conditions in step (1-1) were changed to a temperature of 850° C. and a firing time of 6 hours.

Comparative Example 4

Only the first particles A of Example 1 were used as the positive active material.

The following evaluations 1 to 4 were performed on the positive active materials obtained in the manner described above. The batteries used in the following evaluations 1 to 3 were prepared in the following manner.

The positive electrode was prepared in the following manner. First, 98 wt % of the positive active material, 0.8 wt % of amorphous carbon powder (Ketjen black) and 1.2 wt % of polyvinylidene fluoride (PVdF) were mixed to prepare a positive mixture. Subsequently, the positive mixture was dispersed in N-methyl-2-pyrrolidone (NMP) to prepare a positive mixture slurry, and the positive mixture slurry was then homogeneously applied to a positive electrode current collector formed of an aluminum foil to form a coating layer. Next, the obtained coating layer was dried with hot air, punched to a diameter of 15 mm, and press-molded at a press pressure of 207 Mpa with a press machine (manufactured by RIKEN KIKI CO., LTD.) to obtain a positive electrode.

The negative electrode was prepared in the following manner. First, 95 wt % of graphite powder and 5 wt % of PVdF were mixed to prepare a negative mixture. Subsequently, the negative mixture was dispersed in N-methyl-2-pyrrolidone to prepare a negative mixture slurry, and the negative mixture slurry was then homogeneously applied to a negative electrode current collector formed of a belt-like copper foil to form a coating layer. Next, the obtained coating layer was dried with hot air, punched to a diameter of 16 mm, and compression-molded with a hydraulic press machine to obtain a negative electrode.

Using the positive electrode and the negative electrode prepared as described above, a battery was prepared in the following manner. First, a laminate was prepared by laminating the positive electrode and the negative electrode with a porous polyolefin film interposed therebetween. Subsequently, ethylene carbonate and propylene carbonate were mixed to a volume mixing ratio of 1:1 to prepare a mixed solution. Next, $LiPF_6$ was dissolved in the mixed solution to a concentration of 1 $mol/dm^3$ to prepare a nonaqueous electrolytic solution. Finally, a CR2032 coin-type battery was prepared using the above-mentioned laminate and electrolytic solution.

[Abundance Ratio x of Broken Particle and Abundance Ratio y of Cracked Particle]

First, the prepared battery was disassembled, the positive electrode was taken out, and the positive electrode was washed with dimethyl carbonate (DMC), and dried. Subsequently, a cross-section of the positive electrode was prepared using a cross-section polisher (SM-09010) manufactured by JEOL Ltd. Next, using an SEM (S-4300) manufactured by Hitachi, Ltd., a SEM image of the cross-section was taken at an accelerating voltage of 2 kV and a magnification of 500 times. Specifically, for the positive active material layer present between the positive electrode surface and the positive electrode current collector surface, the positive electrode surface was disposed at the end of the shooting range of the SEM image, and 10 SEM images were taken continuously in a lateral direction. Thereafter, image analysis of the SEM image taken was performed using ImageJ (imagej.nih.gov, National Institutes of Health, NIH).

The image analysis was performed in the following manner. The image was read, the data format was then converted to 8 bits, and unit scale conversion (conversion from pixels to μm) was performed. As binarization processing, a position at which the minimum point was shown in each of the high and low regions was selected with respect to the pixel position of the maximum peak among peaks derived from the positive active material in the pixel distribution, and a positive active material was extracted from the SEM image. As ellipse approximation, contouring and numbering were performed under the conditions of a particle of 50 μm² or more and a roundness of 0 or more and 1.00 or less. Further, first particles A having a longest diameter $d_1$ of 15 μm or more and 30 μm or less after the processing were extracted. For 50 particles given the smallest numbers among the appropriate first particles A, cracked particles were discriminated from broken particles, and the number of broken particles M and the number of cracked particles N were counted. From the following equations, the abundance ratio x of broken particle and the abundance ratio y of cracked particle in the first particles A having the longest diameter $d_1$ of 15 μm or more and 30 μm or less were calculated.

Abundance ratio x of broken particle [%]=(M/50)×100
(M: number of broken particles)

Abundance ratio y of cracked particle [%]=(N/50)×100
(N: number of cracked particles)

Here, cracked particles were discriminated from broken particles in accordance with the following criteria.

Broken particle: particle having a crack with a length ⅕ times or more and ⅓ times or less the longest diameter $d_1$ of the particles, with the crack having an intersection.

Cracked particle: particle having a crack with a length ⅕ times or more and ⅓ times or less the longest diameter $d_1$ of the particles, with the crack having no intersection.

(Definition of crack: two lines face each other in an ellipse approximation image, a gap having a size 0 times to 1/10 times the longest diameter $d_1$ is present outside the outer shape, and the straight line length of one of lines forming the gap)

The longest diameter $d_2$ of the second particles B is determined by the same method as in the case of the longest diameter $d_1$ of the first particles A.

[Particle Diameter and Content of Fine Particles]

First, the prepared battery was disassembled, the positive electrode was taken out, and the positive electrode was washed with dimethyl carbonate (DMC), and dried. Next, the positive electrode was immersed in N-methyl-2-pyrrolidone (NMP) to separate the positive active material layer and the current collector, and the obtained positive active material layer powder was subjected to decantation filtration with NMP multiple times to extract positive active material particles. For the positive active material particles, the particle size distribution was measured with a laser diffraction particle size distribution meter (SALD-2100 manufactured by Shimadzu Corporation) to obtain a volume-based cumulative particle size distribution curve. With the use of the cumulative particle size distribution curve obtained here, the cumulative volume of particles with a particle diameter in a desired range, etc. was calculated, and converted to a volume ratio to calculate the ratio of particles with a particle diameter in a desired range (2 μm or more and 10 μm or less).

In this example, particles smaller than fine particles (less than 2 μm) were hardly generated.

[Filling Ratio]

First, in the same manner as described above, 10 cross-sectional SEMs after ellipse approximation processing were obtained. Next, with the use of each of the obtained cross-sectional SEMs, the occupancy ratio of the positive active material in the range from the positive electrode surface to the positive electrode current collector surface was calculated by measuring the vacancy ratio in image analysis. Next, the occupancy ratio of the positive active material determined from the 10 cross-sectional SEM images was simply averaged (arithmetically averaged) to obtain a filling ratio of the positive active material.

[Charge-Discharge Cycle Characteristics]

First, the manufactured battery was charged under the conditions of an ambient temperature of 45° C., a charge voltage of 4.40 V, a charge current of 10 mA and a charge time of 2.5 hours, and then discharged at a discharge current of 9 mA and a final voltage of 3.0 V to measure the initial discharge capacity. Next, charge-discharge was repeated in the same manner as in the case of determination of the initial capacity, so that the discharge capacity in the 500th cycle was measured. The cycle retention ratio with respect to the initial capacity was determined from the following equation.

"Cycle retention ratio"(%)=("discharge capacity in 500th cycle"/"initial discharge capacity")×100 (%)

TABLE 1

| | Positive active material | | | | | | | | |
|---|---|---|---|---|---|---|---|---|---|
| | First particles A | | Second particles B | | Content ratio of fine particles (vol %) | Filling ratio (%) | Abundance ratio x of broken particle (%) | Abundance ratio y of cracked particle (%) | Cycle characteristic (%) |
| | Composition | Mixing ratio (mass %) | Composition | Mixing ratio (mass %) | | | | | |
| Example 1 | $LiCoO_2$ | 85 | $LiCoO_2$ | 15 | 19 | 93 | 4 | 22 | 78 |
| Example 2 | $LiCoO_2$ | 70 | $LiCoO_2$ | 30 | 33 | 90 | 6 | 6 | 80 |
| Example 3 | $LiCo_{0.99}Ni_{0.0075}Mn_{0.0025}O_2$ | 85 | $LiCoO_2$ | 15 | 21 | 95 | 10 | 18 | 82 |
| Example 4 | $LiCo_{0.98}Ni_{0.015}Mn_{0.005}O_2$ | 85 | $LiCoO_2$ | 15 | 19 | 96 | 8 | 10 | 83 |
| Example 5 | $LiCoO_{1.98}F_{0.02}$ | 85 | $LiCoO_2$ | 15 | 20 | 88 | 4 | 18 | 83 |
| Example 6 | $LiCoO_{1.95}F_{0.05}$ | 85 | $LiCoO_2$ | 15 | 19 | 89 | 4 | 16 | 84 |
| Comparative Example 1 | $LiCoO_2$ | 95 | $LiCoO_2$ | 5 | 11 | 84 | 18 | 24 | 75 |
| Comparative Example 2 | $LiCoO_2$ | 85 | $LiCoO_2$ | 15 | 25 | 88 | 28 | 38 | 73 |
| Comparative Example 3 | $LiCoO_2$ | 85 | $LiCoO_2$ | 15 | 26 | 78 | 34 | 46 | 60 |
| Comparative Example 4 | $LiCoO_2$ | 100 | $LiCoO_2$ | 0 | 0 | 75 | 38 | 52 | 55 |

First particle: particle having a longest diameter $d_1$ of 15 to 30 μm
Second particle: particle having a longest diameter $d_2$ of 2 to 10 μm
Fine particle: particle having a particle diameter of 2 μm or more and 10 μm or less in a particle size distribution measured with a laser diffraction particle size distribution meter It is apparent from Table 1 that when (1) the filling ratio of the positive active material particles in the positive electrode is 85% or more, (2) the positive active material particles include broken particles in which the longest diameter is within the range of 15 μm or more and 30 μm or less, and the crack with a length ⅕ times or more and ⅓ times or less the longest diameter of the particles is present, and the crack has an intersection, and (3) the abundance ratio x of broken particle is more than 0% and 20% or less, good charge-discharge cycle characteristics can be obtained.

While the embodiments of the present technology have been described in detail, the present technology is not limited to the embodiments described above, and it is possible to make various modifications based on the technical concept of the present technology.

For example, the configurations, methods, steps, shapes, materials, numerical values and the like given in the embodiments are merely illustrative, and different configurations, methods, steps, shapes, materials, numerical values and the like may be used as necessary.

The configurations, methods, steps, shapes, materials, numerical values and the like of the embodiments can be combined without departing from the spirit of the present technology.

In the embodiments, the positive active material contains first particles and second particles, but the positive active material may be substantially formed of first particles.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A nonaqueous electrolyte secondary battery comprising:
   a positive electrode,
   a negative electrode, and
   an electrolyte,
   wherein the positive electrode includes positive active material particles having a layered rock salt type crystal structure,
   wherein a filling ratio of the positive active material particles in the positive electrode is 85% or more,
   wherein the positive active material particles include broken particles, formed during compression molding, in which a longest diameter is within a range from 15 μm to 30 μm,
   wherein the broken particles include a crack with a length ⅕ times or more and ⅓ times or less the longest diameter of the broken particles,
   wherein the crack has an intersection, and an abundance ratio x of the broken particles is 2% to 10%,
   wherein the positive active material particles include cracked particles, formed during compression molding, in which the longest diameter is within the range from 15 μm to 30 μm,
   wherein the cracked particles include a crack with a length ⅕ times or more and ⅓ times or less the longest diameter of the cracked particles, and the crack has no intersection,
   wherein an abundance ratio y of the cracked particles is 2% to 30%, and
   wherein the abundance ratio x is equal to or less than the abundance ratio y.

2. The nonaqueous electrolyte secondary battery according to claim 1, wherein the positive electrode further includes positive active material particles having particle diameter within the range from 2 μm to 10 μm in an amount of 5 vol % or more and 40 vol % or less based on the total amount of positive active material.

3. The nonaqueous electrolyte secondary battery according to claim 1, wherein
   the positive electrode includes a positive electrode current collector, and a positive active material layer including the positive active material particles, and
   among the positive active material particles, particles in a boundary portion between the positive electrode current collector and the positive active material layer are embedded in the positive electrode current collector.

4. The nonaqueous electrolyte secondary battery according to claim 1, wherein an average composition of the positive active material particles is represented by formula (A):

$$Li_w M_x N_y O_{2-z} X_z \quad (A)$$

wherein w is more than 0.8 and less than 1.2, x+y is more than 0.9 and less than 1.1, y is 0 or more and less than 0.1, and z is 0 or more and less than 0.05; M includes at least one selected from the group consisting of Co, Ni and Mn; N includes at least one selected from the group consisting of Ti, V, Cr, Mn, Fe, Cu, Na, Mg, Al, Si, K, Ca, Zn, Ga, Sr, Y, Zr, Nb, Mo, Ba, La, W and Bi; and X includes at least one selected from the group consisting of F, Cl and S.

5. The nonaqueous electrolyte secondary battery according to claim 1, wherein an average composition of the positive active material particles is represented by formula (B):

$$Li_a Co_{1-b} R_b O_{2-c} Y_c \quad (B)$$

wherein a is more than 0.8 and less than 1.2, b is 0 or more and less than 0.15, and c is 0 or more and less than 0.05; R includes at least one selected from the group consisting of Ti, V, Cr, Mn, Fe, Ni, Mn, Cu, Na, Mg, Al, Si, K, Ca, Zn, Ga, Sr, Y, Zr, Nb, Mo, Ba, La and W; and Y includes at least one selected from the group consisting of F, Cl and S.

6. The nonaqueous electrolyte secondary battery according to claim 1 further comprising a separator, wherein the separator is provided between the positive electrode and the negative electrode.

7. The nonaqueous electrolyte secondary battery according to claim 6, wherein the separator includes a porous film.

8. The nonaqueous electrolyte secondary battery according to claim 1, wherein the positive electrode further includes a positive electrode current collector.

9. The nonaqueous electrolyte secondary battery according to claim 8, wherein the positive electrode current collector includes at least one of aluminum foil, nickel foil and a stainless steel foil.

10. The nonaqueous electrolyte secondary battery according to claim 1, wherein the abundance ratio x is 4% to 10%, and wherein the abundance ratio y is 6% to 22%.

11. The nonaqueous electrolyte secondary battery according to claim 10, wherein the abundance ratio y is 6% to 18%.

* * * * *